United States Patent
AlTuraiyef

(10) Patent No.: US 12,318,728 B2
(45) Date of Patent: Jun. 3, 2025

(54) OPTIMIZING REGENERATION GAS USAGE IN LIQUID RECOVERY UNITS

(71) Applicant: Saudi Arabian Oil Company, Dhahran (SA)

(72) Inventor: Hamad Abdulrahman AlTuraiyef, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 469 days.

(21) Appl. No.: 17/900,974

(22) Filed: Sep. 1, 2022

(65) Prior Publication Data

US 2024/0075424 A1 Mar. 7, 2024

(51) Int. Cl.
*B01D 53/04* (2006.01)
*B01D 53/26* (2006.01)

(52) U.S. Cl.
CPC ........ *B01D 53/261* (2013.01); *B01D 53/0454* (2013.01); *B01D 2256/245* (2013.01); *B01D 2257/80* (2013.01)

(58) Field of Classification Search
CPC ............ B01D 53/1418; B01D 53/1456; B01D 53/263; B01D 2256/245; B01D 2257/80; B01D 2259/40083; B01D 2259/40086; B01D 53/04; B01D 53/0454; B01D 53/261
See application file for complete search history.

(56) References Cited

U.S. PATENT DOCUMENTS

| | | | |
|---|---|---|---|
| 7,846,237 B2 * | 12/2010 | Wright | B01D 53/047 96/11 |
| 9,687,778 B1 * | 6/2017 | Fischer | B01D 53/28 |
| 2018/0311609 A1 * | 11/2018 | McCool | G05B 19/401 |
| 2021/0069634 A1 * | 3/2021 | Cullinane | B01D 53/1425 |
| 2022/0161187 A1 * | 5/2022 | Lee | B01D 53/0462 |

FOREIGN PATENT DOCUMENTS

| | | | |
|---|---|---|---|
| CN | 101713988 | 4/2014 | |
| CN | 102380281 | 7/2014 | |
| WO | WO-2013019116 A1 * | 2/2013 | ............. B01D 53/04 |

* cited by examiner

*Primary Examiner* — Robert Clemente
*Assistant Examiner* — Rachel Marie Slaugenhaupt
(74) *Attorney, Agent, or Firm* — Fish & Richardson P.C.

(57) ABSTRACT

A moisture-carrying sweet gas stream is flowed through a gas dehydrator carrying dessicants. The dessicants absorb moisture in the sweet gas stream. A moisture-free regen gas is flowed at a first volumetric flow rate through the gas dehydrator to regenerate the dessicants by absorbing the moisture from the dessicants. Sales gas is received at a second volumetric flow rate from a sales gas compressor. It is determined that the second volumetric flow rate of the sales gas is at least equal to the first volumetric flow rate of the regen gas. In response and to optimize regeneration gas (regen gas) usage in liquid recovery units, the regen gas flowed through the gas dehydrator is replaced with the sales gas.

14 Claims, 2 Drawing Sheets

OPTIMIZING REGENERATION GAS USAGE IN LIQUID RECOVERY UNITS

TECHNICAL FIELD

This disclosure relates to hydrocarbon processing plants, and more particularly to plants that process Acid gas to produce sales gas and natural gas liquids (NGLs).

BACKGROUND

Sour gas is a byproduct of processing hydrocarbons produced from subsurface reservoirs. Sour gas includes acid gases such as hydrogen sulfide, carbon dioxide and other chemicals that are harmful or toxic or both. Hydrocarbon processing plants (sometimes called gas plants) remove acid gas from natural gas in a process called gas sweetening. The output of gas sweetening and any other processing is sales gas and NGLs that are ready for commercial distribution. One step in the acid gas processing involves receiving regeneration gas (or regen gas) from regen gas compressors in liquid recovery units.

SUMMARY

This specification describes technologies relating to optimizing regen gas usage in liquid recovery units.

Certain aspects of the subject matter described here can be implemented as a method. A computer system receives a first volumetric flow rate of sales gas output by a sales gas compressor. The sales gas compressor compresses a low pressure (LP) fuel gas stream to output the first quantity of sales gas. The computer system receives a second volumetric flow rate of regen gas output by a regen compressor. The regen compressor compresses a high pressure stream received from a separator drum that separates the HP residue gas from a liquid. The regen gas, at the second volumetric flow rate, is flowed to a gas dehydrator to regenerate saturated desiccants in the gas dehydrator. The computer system determines that the first volumetric flow rate of sales gas is at least equal to the second volumetric flow rate of regen gas. In response to determining that the first volumetric flow rate of sales gas is at least equal to the second volumetric flow rate of regen gas, the computer system controls a regen gas flow control valve to stop flowing the regen gas to the gas dehydrator, and controls a sales gas flow control valve to flow the sales gas to the gas dehydrator at the second volumetric flow rate.

An aspect combinable with any other aspect includes the following features. Before controlling the regen gas flow control valve to stop flowing the regen gas to the gas dehydrator, and controlling the sales gas flow control valve to flow the sales gas to the gas dehydrator, and, in response to determining that the first volumetric flow rate of sales gas is at least equal to the second volumetric flow rate of regen gas, the computer system can perform these additional operations. The computer system can determine that a moisture level of the sales gas is less than a moisture level threshold at which saturated desiccants in the gas dehydrator can be regenerated. In response to determining that the moisture level of the sales gas is less than the moisture level threshold, the computer system can control the regen gas flow control valve and the sales gas flow control valve.

An aspect combinable with any other aspect includes the following features. To determine that the moisture level of the sales gas is less than the moisture level threshold, a signal representing the moisture level of the sales gas is received from a moisture level sensor. A value represented by the signal is compared with a stored value representing the moisture level threshold.

An aspect combinable with any other aspect includes the following features. After controlling the regen gas flow control valve to stop flowing the regen gas to the gas dehydrator and controlling the sales gas flow control valve to flow the sales gas to the gas dehydrator, the regen gas compressor can be shut down.

Certain aspects of the subject matter described here can be implemented as a computer-readable medium (e.g., a non-transitory computer-readable medium) storing instructions executable by one or more computer systems to perform operations described here. Certain aspects of the subject matter described here can be implemented as a computer system including one or more computer processors and a computer-readable medium (e.g., a non-transitory computer-readable medium) storing instructions executable by the one or more computer processors to perform the operations described here.

Certain aspects of the subject matter described here can be implemented as a method. A moisture-carrying sweet gas stream is flowed through a gas dehydrator carrying desiccants. The desiccants adsorb moisture in the sweet gas stream. A moisture-free regen gas is flowed at a first volumetric flow rate through the gas dehydrator to regenerate the desiccants by adsorbing the moisture from the desiccants. Sales gas is received at a second volumetric flow rate from a sales gas compressor. It is determined that the second volumetric flow rate of the sales gas is at least equal to the first volumetric flow rate of the regen gas. In response, the regen gas flowed through the gas dehydrator is replaced with the sales gas.

An aspect combinable with any other aspect includes the following features. A separator separates HP residue gas from a liquid. A regen compressor compresses the separated HP residue gas resulting in the regen gas at the first volumetric flow rate.

An aspect combinable with any other aspect includes the following features. To replace the regen gas flowed through the gas dehydrator with the sales gas, a regen gas flow control valve, which controls flow of the regen gas to the gas dehydrator, is closed. After closing the regen gas flow control valve, a sales gas flow control valve that controls flow of the sales gas to the gas dehydrator, is opened.

An aspect combinable with any other aspect includes the following features. After replacing the regen gas with the sales gas, the regen compressor is shut down.

An aspect combinable with any other aspect includes the following features. Before replacing the regen gas flowed through the gas dehydrator with the sales gas, a moisture content of the sales gas is determined to be less than a moisture content threshold.

An aspect combinable with any other aspect includes the following features. A sales gas compressor compresses LP fuel gas resulting in the sales gas the second volumetric flow rate.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Hydrocarbon processing plants process sour gas in several treatment phases to remove the acid gases and produce clean sales gas and NGL. The acid gas is removed in gas treatment units (e.g., amine based units) to produce sweet gas which is sent to the liquid recovery units. In the liquid recovery units, chilldown trains cool the feed gas supplied to produce two main products—sales gas and NGL. The recovery and separation of heavy end hydrocarbons is done in three chilldown trains using ethane and propane refrigerants. In the first stage, separated NGL and feed gas pass through dehydration unit that includes three dehydrator drums and one regen gas compressor to eliminate any moisture-preventing hydrate formation across downstream chilldown trains. In the third stage, liquid ethane is used as a cooling medium to recover and knock out heavier hydrocarbons. NGL outlet streams of all three chilldown train separators are sent to de-methanizer column to remove most of methane as sales gas in the column overhead and NGL at the bottom.

During normal operation at liquid recovery units, HP residue gas is used to supply the regen gas compressor with dry gas which is utilized in the dehydration unit for desiccant regeneration. In cases such as during low plant feed rate, sales gas compressors, which acts as an end user to liquid recovery units are subjected to partial recycle to preserve its minimum suction flow. This results in reprocessing the sales gas product which leads to energy waste.

This disclosure describes an optimization logic implemented using a computer system (e.g., a controller). The optimization logic uses a feed forward control loop and a feedback control loop. Using both control loops, the optimization logic is implemented to control sales gas flow from sales gas compressors. When implemented, the logic would use part of the recycled flow of sales gas in place of regen gas to supply the dehydration unit (i.e., gas dehydrator) in liquid recovery modules instead of using HP residue which needs further compression. The logic, when implemented, will lead to fully recycling the regen gas compressor resulting in additional energy conservation as well as cost saving. Implementing the logic will also eliminate the concern of reprocessing the sales gas product.

Figure 1:
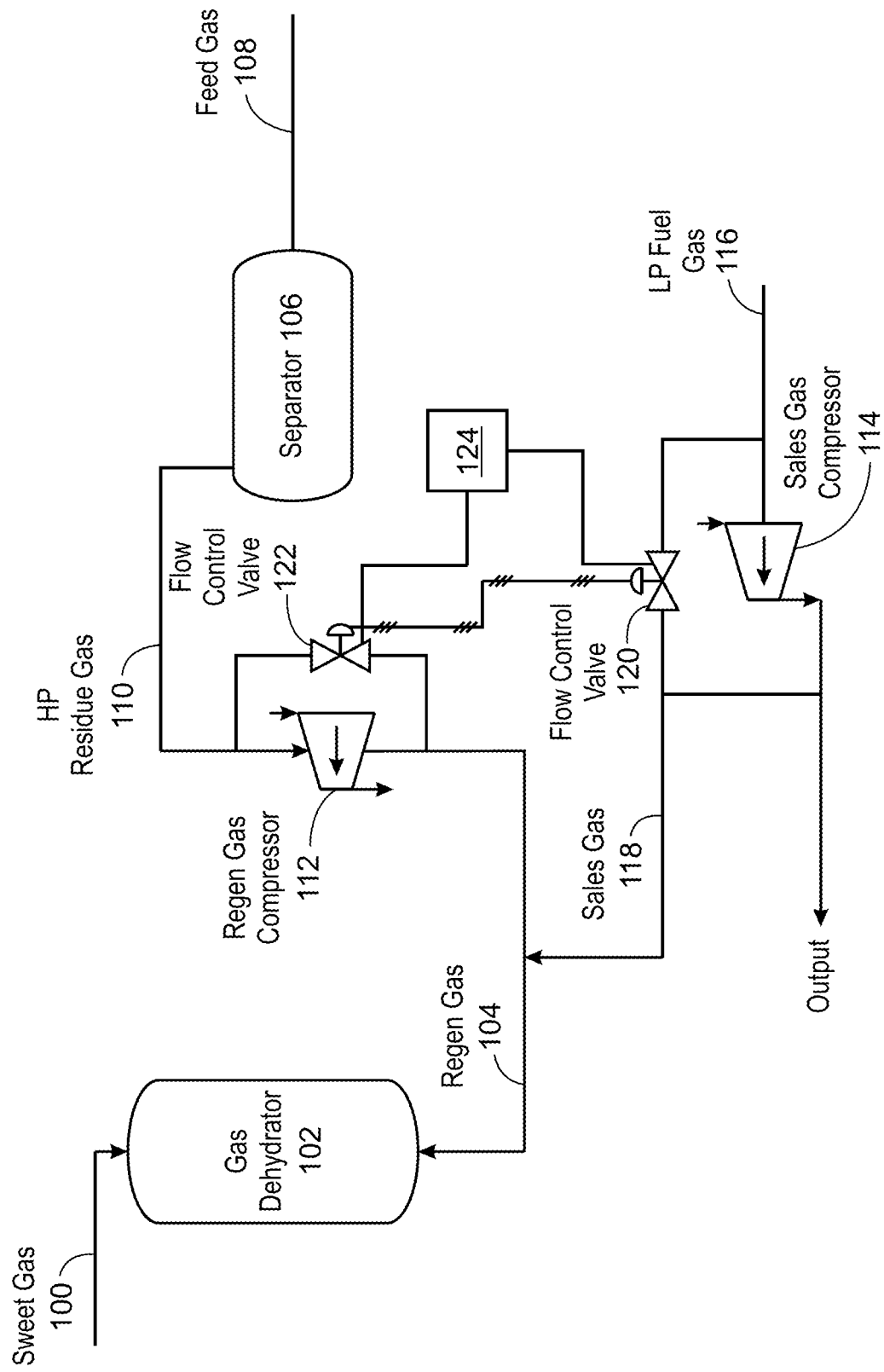
FIG. 1 is a schematic diagram showing an example process to optimize regen gas usage in liquid recovery units.

FIG. 1 is a schematic diagram showing an example process to optimize regen gas usage in liquid recovery units. In the process, sweet gas 100 is flowed through a top of a gas dehydrator 102. The sweet gas is a wet gas stream that was treated in a gas treating unit to extract hydrogen sulfide and carbon dioxide prior to entering the liquid recovery unit. The gas dehydrator 102 is a vertical vessel that includes various layers of solid particles including desiccants, e.g., activated alumina, ceramic balls. The sweet gas 100 carries moisture, which the desiccants as the sweet gas stream flows through the gas dehydrator 102, specifically over the desiccants. The gas dehydrator 102 diverts the sweetgas 100, from which the desiccants have adsorbed the moisture, to a different process.

Over time, the desiccants become saturated with moisture and cannot adsorb further moisture from more moisture-carrying sweet gas 100 that is flowed through the gas dehydrator 102. To regenerate the desiccants, i.e., to remove the moisture from the dessicants, moisture-free regen gas 104 is flowed into the bottom of the gas dehydrator 102. The regen gas 104 adsorbs the moisture from the dessicants and exits the gas dehydrator 102.

The regen gas 104 is received from a separator 106 (e.g., a $3^{rd}$ separator). The separator 106 is a horizontal drum that receives feed gas 108 and separates liquid from the feed gas 108, resulting in HP residue gas 110. Wet sweet gas from which moisture has been absorbed becomes dry gas. The dry gas enters several cooling processes in the liquid recovery unit to recover heavy hydrocarbons. The recovery process includes heat exchangers and separators. The separator 106 is the last phase of the separation. The outlet stream from the third separator (i.e., separator 106) is the HP residue gas which is used as a regen gas. The HP residue gas 110 is flowed to a gas compressor (called regen compressor 112) to be compressed and flowed to the gas dehydrator 102 as regen gas 104 at a regen gas volumetric flow rate (measured in million standard cubic feet per day or MMSCFD). The gas dehydrator 102 and the separator 106 are in the same liquid recovery unit. The HP residue gas 110 includes methane, ethane and propane. Example compositions for these gases are listed in the table below.

| | Normal Mode of Operation | Standby Regen Gas |
|---|---|---|
| Methane | 89% | 87.5% |
| Ethane | 7.5% | 8% |
| Propane | 0.5% | 1.5% |
| Butane+ | 3% | 3.5% |

Another gas compressor (called sales gas compressor 114) is located downstream of the liquid recovery unit. Although one sales gas compressor 114 is shown in FIG. 1, multiple sales gas compressors (e.g., three sales gas compressors) can be implemented. The sales gas compressor 114 receives LP fuel gas 116 and compresses the LP fuel gas 116 into sales gas 118. The LP fuel gas originates from a fuel gas stream from another unit. The LP fuel gas stream has a composition similar to the HP residue gas. In operation, the sales gas compressor 114 can flow the compressed sales gas 118 at a desired flow rate called a sales gas volumetric flow rate (also measured in MMSCFD). Usually, the sales gas compressor 114 is subjected to low suction flow which makes it necessary to recycle a portion of that flow to maintain the suction pressure and save the compressor from a potential trip.

The composition of the sales gas 118 is substantially identical to that of the regen gas 104 such that the two gases can be interchangeably used to regenerate the desiccants in the gas dehydrator 102. Consequently, as long as the sales gas 118 is delivered at a volumetric flow rate needed to perform the desiccant regeneration operation and as long as the sales gas 118 is substantially moisture-free, the sales gas 118 can be used in place of the regen gas 104 output from the regen gas compressor 112. In this context, "substantially moisture-free" means that a moisture content of the gas is at or below a moisture content threshold. For example, a substantially moisture-free sales gas 118 has a moisture content at or below a moisture content threshold above which the sales gas 118 cannot effectively regenerate the moisture-saturated desiccants in the gas dehydrator 102. Using sales gas 118 output by the sales gas compressor 114 in place of the regen gas 104 output by the regen gas compressor 112 allows operating the regen gas compressor 112 at lower speeds or shutting down the regen gas compressor 112 entirely, thereby saving energy.

In some implementations, the process includes flow control valves to control flow of the gases. For example, a sales gas flow control valve 120 controls flow of the sales gas 118 downstream of the sales gas compressor 114 to the bottom of the gas dehydrator 102. Also, a regen gas flow control valve 122 controls flow of the regen gas 104 downstream of the regen gas compressor 114 to the bottom of the gas dehydrator 102.

A controller 124 is operatively coupled (e.g., via wired or wireless networks or both) to each flow control valve. In some implementations, the controller 124 is implemented as a computer system that includes one or more processors and a computer-readable storage medium (e.g., a non-transitory computer-readable storage medium) that store computer instructions executable by the one or more processors to perform operations including controlling the operation of the flow control valve. In some implementations, the controller 124 is implemented as processing circuitry, firmware, software, hardware or any combination of them with or without the computer system. In operation, the controller 124 can transmit signals to each flow control valve based on which the flow control valve can open or close, fully or partially.

In some implementations, each flow control valve can implement a controller substantially similar to the controller 124. Each flow control valve can additionally determine sensors (e.g., a flowmeter) that can measure a volumetric flow rate of gas. For example, the sales gas flow control valve 120 can include or be operatively connected to a flowmeter that can measure the sales gas volumetric flow rate. Similarly, the regen gas flow control valve 122 can include or be operatively connected to a flowmeter that can measure the regen gas volumetric flow rate. Each valve can transmit the measured volumetric flow rate to the controller 124. The controller 124 can compare the two volumetric flow rates and determine if the sales gas 118 can replace the regen gas 104 as the stream to be fed to the bottom of the gas dehydrator 102.

To do so, in some implementations, the controller 124 can implement a feedback loop. For example, the controller 124 store a threshold volumetric flow rate, e.g., 120 MMSCFD or a different threshold volumetric flow rate. The controller 124 can determine if the sales gas volumetric flow rate is at least equal to the threshold volumetric flow rate. If yes, then the controller 124 can cause the regen gas flow control valve 122 to close and open the sales gas flow control valve 120 by transmitting appropriate command signals to each flow control valve. After the regen gas 104 flow to the gas dehydrator 102 has been stopped, the controller 124 can send a signal to the regen gas compressor 112 to fully recycle and shutdown since the sales gas 118 from the sales gas compressor 114 is being used as a source of regen gas in the gas dehydrator 102.

In some implementations, the controller 124 can implement a feedforward loop to control the sales gas flow to the gas dehydrator 102. For example, the sales gas flow control valve 120 can include or be connected to a moisture sensor that can sense a moisture content of the sales gas 118. The moisture sensor can transmit a signal representing the moisture content of the sales gas 118 to the controller 124. The controller 124 can store a threshold moisture content above which a gas cannot effectively regenerate the saturated desiccants in the gas dehydrator 102. The controller 124 can compare the moisture content of the sales gas 118 from the received signal to the threshold moisture content. If the moisture content of the sales gas 118 is greater than the threshold moisture content, then the controller 124 overrides the feedback loop described earlier. That is, even if the sales gas volumetric flow rate is sufficient to regenerate the saturated desiccant, the controller 124 does not replace the regen gas 104 with the sales gas 118 because of the high moisture content in the sales gas 118. In this manner, the controller 124 deploys the feedforward loop to control the sales gas compressor 114 recycled flow and avoid using the sales gas 118 in the gas dehydrator 102 when the sales gas 118 is subjected to high amount of moisture.

In some implementations, the controller 124 can cause a combination of the regen gas 104 and the sales gas 118 to be flowed to the bottom of the gas dehydrator 102 to regenerate the saturated desiccant. For example, in a default state, the sales gas flow control valve 120 can be fully closed and the regen gas flow control valve 122 can be fully open. In this default state, only regen gas 104, and no sales gas 118, flows to the gas dehydrator 102. The controller 124 can determine that the regen gas volumetric flow rate is below the threshold volumetric flow rate needed to regenerate the saturated dessicant. The controller 124 can determine a difference between the threshold volumetric flow rate and the regen gas volumetric flow rate. The controller 124 can cause the sales gas flow control valve 120 to be opened to a level sufficient to flow sales gas 118 at a volumetric flow rate equal to the determined difference. By doing so, the controller 124 uses both the regen gas 104 from the regen gas compressor 112 and the sales gas 118 from the sales gas compressor 118 to flow gas at the threshold volumetric flow rate into the gas dehydrator 102. Here too, before opening the sales gas flow control valve 120, the controller 124 checks a moisture content of the sales gas 118, and does not cause the sales gas flow control valve 120 to open if the moisture content is greater than the threshold moisture content.

Figure 2:
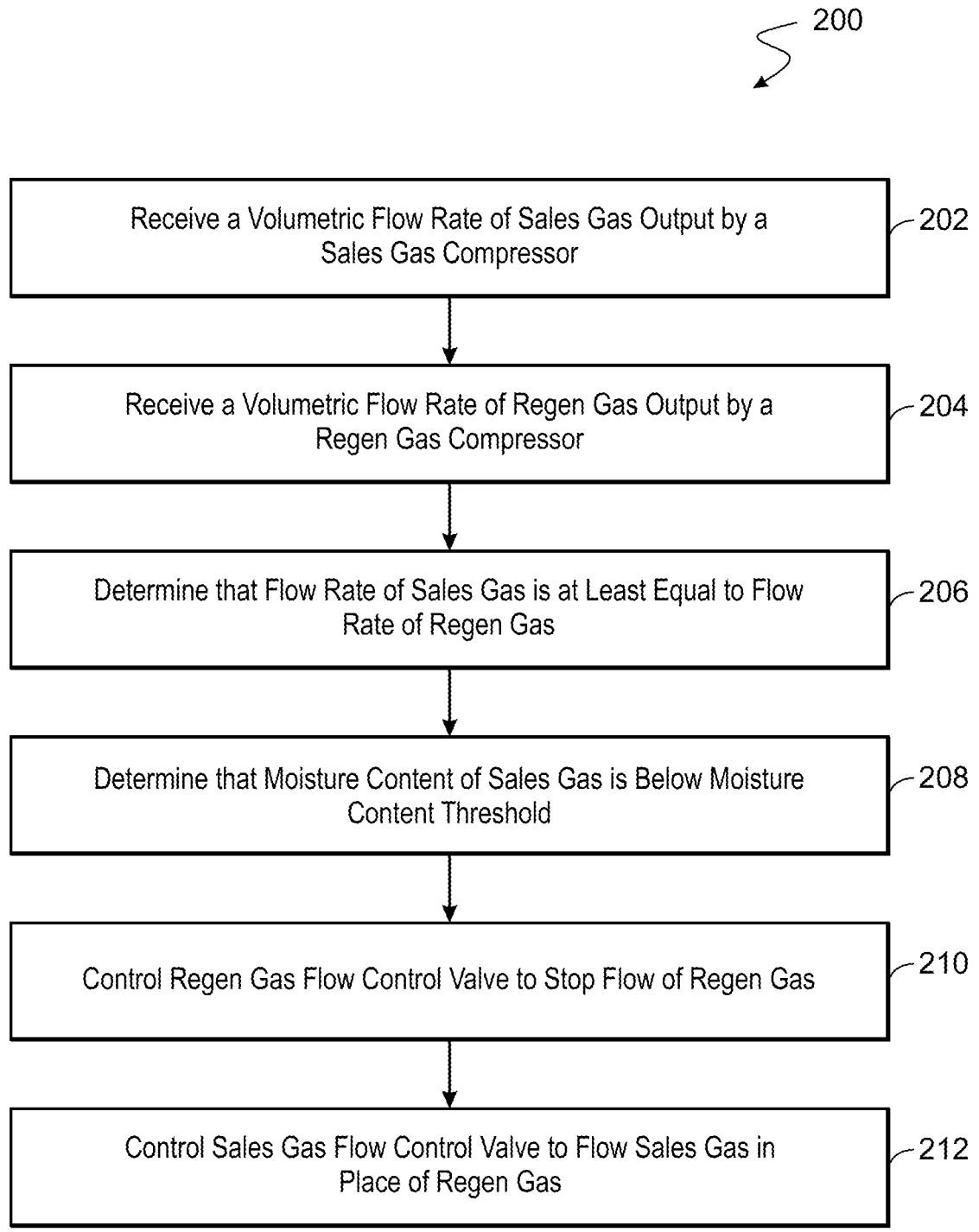
FIG. 2 is a flowchart of an example of a process to optimize regen gas usage in liquid recovery units.

FIG. 2 is a flowchart of an example of a process 200 to optimize regen gas usage in liquid recovery units. The process 200 can be implemented by the controller 124. At 202, the controller 124 receives a volumetric flow rate of sales gas output by a sales gas compressor (e.g., a first volumetric flow rate). The sales gas compressor compresses a LP fuel gas stream to output the first quantity of sales gas. At 204, the controller 124 receives another volumetric flow rate of regen gas output by a regen compressor (e.g., a second volumetric flow rate). At 206, the controller 124 determines that the first volumetric flow rate of sales gas is at least equal to the second volumetric flow rate of regen gas. At 208, the controller 124 determines that moisture content of sales gas is below moisture content threshold. At 210, the controller 124 controls the regen gas flow control valve to stop flow of regen gas to the bottom of the gas dehydrator 102. At 212, the controller 124 controls the sales gas flow control valve to flow sales gas in place of regen gas to the bottom of the gas dehydrator 102.

Thus, particular implementations of the subject matter have been described. Other implementations are within the scope of the following claims.

The invention claimed is:

1. A method comprising:
receiving, by a computer system, a first volumetric flow rate of sales gas output by a sales gas compressor, wherein the sales gas compressor compresses a low pressure fuel gas stream to output the first quantity of sales gas;
receiving, by the computer system, a second volumetric flow rate of regen gas output by a regen compressor, wherein the regen compressor compresses a high pressure residue gas stream received from a separator drum that separates the high pressure residue gas from a liquid, wherein the regen gas, at the second volumetric flow rate, is flowed to a gas dehydrator to regenerate saturated desiccants in the gas dehydrator;

determining, by the computer system, that the first volumetric flow rate of sales gas is at least equal to the second volumetric flow rate of regen gas; and in response to determining that the first volumetric flow rate of sales gas is at least equal to the second volumetric flow rate of regen gas:

controlling, by the computer system, a regen gas flow control valve to stop flowing the regen gas to the gas dehydrator, and controlling, by the computer system, a sales gas flow control valve to flow the sales gas to the gas dehydrator at the second volumetric flow rate.

2. The method of claim 1, further comprising, before controlling the regen gas flow control valve to stop flowing the regen gas to the gas dehydrator and controlling the sales gas flow control valve to flow the sales gas to the gas dehydrator, and in response to determining that the first volumetric flow rate of sales gas is at least equal to the second volumetric flow rate of regen gas:

determining that a moisture level of the sales gas is less than a moisture level threshold at which saturated desiccants in the gas dehydrator can be regenerated; and in response to determining that the moisture level of the sales gas is less than the moisture level threshold, controlling the regen gas flow control valve and the sales gas flow control valve.

3. The method of claim 2, wherein determining that the moisture level of the sales gas is less than the moisture level threshold comprises:

receiving, from a moisture level sensor, a signal representing the moisture level of the sales gas; and comparing a value represented by the signal with a stored value representing the moisture level threshold.

4. The method of claim 1, further comprising, after controlling the regen gas flow control valve to stop flowing the regen gas to the gas dehydrator and controlling the sales gas flow control valve to flow the sales gas to the gas dehydrator, controlling the regen gas compressor to shut down.

5. A non-transitory computer-readable medium storing instructions executable by one or more computer systems to perform operations comprising:

receiving a first volumetric flow rate of sales gas output by a sales gas compressor, wherein the sales gas compressor compresses a low pressure fuel gas stream to output the first quantity of sales gas;

receiving a second volumetric flow rate of regen gas output by a regen compressor, wherein the regen compressor compresses a high pressure residue gas stream received from a separator drum that separates the high pressure residue gas from a liquid, wherein the regen gas, at the second volumetric flow rate, is flowed to a gas dehydrator to regenerate saturated desiccants in the gas dehydrator;

determining that the first volumetric flow rate of sales gas is at least equal to the second volumetric flow rate of regen gas; and in response to determining that the first volumetric flow rate of sales gas is at least equal to the second volumetric flow rate of regen gas:

controlling a regen gas flow control valve to stop flowing the regen gas to the gas dehydrator, and controlling a sales gas flow control valve to flow the sales gas to the gas dehydrator at the second volumetric flow rate.

6. The medium of claim 5, wherein the operations further comprise, before controlling the regen gas flow control valve to stop flowing the regen gas to the gas dehydrator and controlling the sales gas flow control valve to flow the sales gas to the gas dehydrator, and in response to determining that the first volumetric flow rate of sales gas is at least equal to the second volumetric flow rate of regen gas:

determining that a moisture level of the sales gas is less than a moisture level threshold at which saturated desiccants in the gas dehydrator can be regenerated; and in response to determining that the moisture level threshold, controlling the regen gas flow control valve and the sales gas flow control valve.

7. The medium of claim 6, wherein determining that the moisture level of the sales gas is less than the moisture level threshold comprises:

receiving, from a moisture level sensor, a signal representing the moisture level of the sales gas; and comparing a value represented by the signal with a stored value representing the moisture level threshold.

8. The medium of claim 5, wherein the operations further comprise, after controlling the regen gas flow control valve to stop flowing the regen gas to the gas dehydrator and controlling the sales gas flow control valve to flow the sales gas to the gas dehydrator, controlling the regen gas compressor to shut down.

9. A method comprising:

flowing a moisture-carrying sweet gas stream through a gas dehydrator carrying desiccants, wherein the desiccants collect moisture in the sweet gas stream;

flowing a moisture-free regen gas at a volumetric flow rate through the gas dehydrator to regenerate the desiccants by collecting the moisture from the desiccants;

receiving sales gas at a volumetric flow rate from a sales gas compressor;

determining that the volumetric flow rate of the sales gas is at least equal to the volumetric flow rate of the regen gas; and in response to determining that the volumetric flow rate of the sales gas is at least equal to the volumetric flow rate of the regen gas, replacing the regen gas flowed through the gas dehydrator with the sales gas.

10. The method of claim 9, further comprising:

separating, by a separator, high pressure residue gas from a liquid; and compressing, by a regen compressor, the separated high pressure residue gas resulting in the volumetric flow rate of the regen gas.

11. The method of claim 10, wherein replacing the regen gas flowed through the gas dehydrator with the sales gas comprises:

closing a regen gas flow control valve that controls flow of the regen gas to the gas dehydrator; and after closing the regen gas flow control valve, opening a sales gas flow control valve that controls flow of the sales gas to the gas dehydrator.

12. The method of claim 11, further comprising after replacing the regen gas with the sales gas, shutting down the regen compressor.

13. The method of claim 9, wherein before replacing the regen gas flowed through the gas dehydrator with the sales gas, the method further comprises determining that a moisture content of the sales gas is less than a moisture content threshold.

14. The method of claim 9, further comprising compressing, by a sales gas compressor, low pressure fuel gas resulting in the volumetric flow rate of the sales gas.

\* \* \* \* \*